US006814498B2

(12) United States Patent
Kang et al.

(10) Patent No.: US 6,814,498 B2
(45) Date of Patent: Nov. 9, 2004

(54) INTEGRATION OF FUSED GLASS COLLIMATED COUPLER FOR USE IN OPTO-ELECTRONIC MODULES

(75) Inventors: Keith Kang, Hollis, NH (US); John Trezza, Nashua, NH (US)

(73) Assignee: Xanoptix, Inc., Merrimack, NH (US)

( * ) Notice: Subject to any disclaimer, the term of this patent is extended or adjusted under 35 U.S.C. 154(b) by 0 days.

(21) Appl. No.: 10/817,190

(22) Filed: Apr. 2, 2004

(65) Prior Publication Data

US 2004/0190825 A1 Sep. 30, 2004

Related U.S. Application Data

(63) Continuation of application No. 10/180,239, filed on Jun. 26, 2002, now Pat. No. 6,722,788.
(60) Provisional application No. 60/365,489, filed on Mar. 18, 2002, provisional application No. 60/302,205, filed on Jun. 29, 2001, and provisional application No. 60/302,479.

(51) Int. Cl.$^7$ ................................................. G02B 6/38
(52) U.S. Cl. ......................................................... 385/60
(58) Field of Search .............................. 385/52, 60, 78, 385/89, 95–99

(56) References Cited

U.S. PATENT DOCUMENTS

| | | | |
|---|---|---|---|
| 3,825,318 A | 7/1974 | Croset et al. | |
| 4,230,385 A | 10/1980 | Ammon et al. | |
| 4,744,627 A | 5/1988 | Chande et al. | |
| 4,966,432 A | 10/1990 | Okada et al. | |
| 5,175,928 A | 1/1993 | Grabbe | |
| 5,214,730 A | 5/1993 | Nagasawa et al. | |
| 5,259,052 A | 11/1993 | Briggs et al. | |
| 5,379,361 A | 1/1995 | Maekawa et al. | |
| 5,400,429 A | 3/1995 | Ames et al. | |
| 5,473,716 A | 12/1995 | Lebby et al. | |
| 5,579,426 A | 11/1996 | Li et al. | |
| 5,613,024 A | 3/1997 | Shahid | |
| 5,664,039 A | 9/1997 | Grinderslev et al. | |
| 5,671,311 A | 9/1997 | Stillie et al. | |
| 5,743,785 A | 4/1998 | Lundberg et al. | |
| 5,761,350 A | 6/1998 | Koh | |
| 5,853,626 A | 12/1998 | Kato | |
| 6,174,424 B1 | 1/2001 | Wach et al. | |
| 6,246,813 B1 | 6/2001 | Zheng | |
| 6,292,529 B1 | 9/2001 | Marcovici et al. | |
| 6,324,316 B1 | 11/2001 | Fouquet et al. | |
| 6,328,482 B1 | 12/2001 | Jian | |
| 6,379,053 B1 | 4/2002 | van Doorn | |
| 6,442,306 B1 | 8/2002 | Dautartas et al. | |
| 2001/0051026 A1 | 12/2001 | Steinberg et al. | |

OTHER PUBLICATIONS

Ayliffe, M.H., "Optomechanical, electrical and thermal packaging of large 2D optoelectronic device arrays for free space optical interconnects", *SPIE*, vol. 3490, pp. 502–505.

Basavanhally, N.R. et al., "Optoelectronic Packaging of Two–Dimensional Surface Active Devices", *IEEE Transactions On Components, Packaging, And Manufacturing Technology—Part B*, vol. 19, No. 1, pp. 107–114, 1996.

(List continued on next page.)

*Primary Examiner*—Khiem Nguyen
(74) *Attorney, Agent, or Firm*—Morgan & Finnegan LLP

(57) ABSTRACT

An optical unit has multiple optical devices, a collimated coupler disposed relative to the multiple optical devices so that laser light can be transferred between at least two of the multiple optical devices and the collimated coupler without crosstalk, and a fused glass collimator, disposed within the collimated coupler, having multiple optical fibers arranged in a predetermined arrangement relative to the multiple optical devices so that the number of optical fibers is always equal or greater than the number of optical devices on a use basis.

8 Claims, 6 Drawing Sheets

OTHER PUBLICATIONS

Boisset, G.C. et al., "On–Die Diffractive Alignment Structures for Packaging of Microlens Arrays with 2–D Optoelectronic Device Arrays", *IEEE Photonics Technology Letters*, vol. 8, No. 7, pp. 918–920, Jul. 1996.

Cryan, C.V., "Two–dimensional multimode fibre array for optical interconnects", *IEEE Electronic Letters Online No. 19980073*, Oct. 23, 1997.

Giboney, K.S., "Parallel–Optical Interconnect Development at HP Laboratories", *SPIE*, vol. 3005, pp. 193–201, Feb. 1997.

Hall, J.P. et al., "Packaging of VCSEl, MC–LED and Detector 2–D Arrays", Electronic Components and Technology Conference, pp. 778–782, 1998.

Hayashi T. and Tsunctsugu H, "Optical Module with MU Connector Interface Using Self–alignment Technique by Solder–bump Chip Bonding", Electronic Components and Technology Conference, p. 13–19, 1996.

Ishida, H. et al., "Two–dimensionally arranged 24–fiber optical connectors", *OPC '97 Technical Digest*, pp. 189–190, 1997.

Jöhnck M. et al., "8X* Pof Based Interchip Interconnection with 2.5 Gbit/s Per Channel Data Transmission", ECOC '98, pp. 35 and 36, Sep. 20–24, 1998.

Kosaka, M. et al, "Plastic–Based Receptacle–Type VCSEL–Array modules with One and Two Dimensions Fabricated using the self–Alignment Mounting Technique," IEEE Electronic Components and Technology Conference, pp. 382–390 (1997).

Koyabu, K. et al., "Fabrication of Two–Dimensional Fiber Arrays Using Microferrules", *IEEE*, pp. 11–19, 1998.

Lee, S.S., et al. "Self–Aligned Integration of 8 × 1 Micromachined Micro–Fresnel Lens Arrays And 8 ×1 Vertical Cavity Surface Emitting Laser Arrays For Free–Space Optical Interconnect", *IEEE*, pp. 31.2.1–31.2.4, 1994.

Liu, Yongsheng et al., "Design, implementation, and characterization of a hybrid optical interconnect for a four–stage free–space optical backplane demonstrator", *Applied Optics*, vol. 37, No. 14, pp. 2895–2911, May 10, 1998.

Maj, T. et al., "Interconnection of a two–dimensional array of vertical–cavity surface–emitting lasers to a receiver array by means of a fiber image guide", *Applied Optics*, No. 5, pp. 683–689, Feb. 10, 2000.

McCormick, F.B., "Smart Pixel Optics and Packaging", IEEE/LEOS Summer Topical Meeting: Smart Pickels, pp. 45 and 46, Aug. 1996.

Ohki, A. et al., "Multi–channel optical coupling between VCSEL arrays and multimode optical fibers for a 40–channel parallel optical interconnection module", *IEEE*, pp. 47 and 48, 1998.

G. Proudley, et al., "Fabrication of two dimensional fiber optic arrays for an optical crossbar switch," Optical Engineering, vol. 33, #2, pp. 627–635, Feb. 1994.

Sasian, J. et al., "Fabrication of fiber bundle arrays for free–space photonic switching systems", *Optical Engineer*, vol. 33, No. 9, pp. 2979–2985, Sep. 1994.

Söchtig, J. et al., "Replicated Plastic Optical Components for Optical Micro Systems", *IEEE*, pp. 37 and 38, 1998.

Tooley, F., "Challenges in Optically Interconnecting Electronics", *IEEE Journal Of Selected Topics In Quantum Electronics*, vol. 2, No. 1, pp. 3–13, Apr. 1996.

INTEGRATION OF FUSED GLASS COLLIMATED COUPLER FOR USE IN OPTO-ELECTRONIC MODULES

CROSS REFERENCE TO RELATED APPLICATIONS

This application claims priority under 35 USC 119(e)(1) of U.S. Provisional Patent Application Ser. No. 60/302,479, U.S. Provisional Patent Application Ser. No. 60/302,205 filed Jun. 29, 2001, as well as U.S. Provisional Patent Application Ser. No. 60/365,489 filed Mar. 18, 2002.

This application is a continuation of application Ser. No. 10/180,239, filed Jun. 26, 2002, now U.S. Pat. No. 6,722,788 claims priority under 35 USC 119(e)(1) of U.S. Provisional Patent Application Ser. No. 60/302,479, filed Jun. 29, 2001 U.S. Provisional Patent Application Ser. No. 60/302,205 filed Jun. 29, 2001, as well as U.S. Provisional Patent Application Ser. No. 60/365,489 filed Mar. 18, 2002.

FIELD OF THE INVENTION

This invention relates to passive optical elements and, more particularly, to passive optical collimating elements.

BACKGROUND

When laser or LED light is emitted from lasers (or output from fibers to detectors or modulators), the light diffracts (i.e. it spreads out as it travels). If that light is allowed to traverse a large distance without entering a fiber or being focused by a lens, it spreads out in area quickly. If the optical devices which emit or receive this light are spaced close to one another in an array light from/to one optical device can mix with the light to/from adjacent devices.

FIG. 1 shows such a condition where light is output from an array of lasers and the light from each one spreads out. If the distance the light travels in free space is long enough (typically on the order of 50 micrometers based upon a typical laser-to-laser spacing (i.e. the "pitch") of 125 to 250 microns, the light will spread out enough before it reaches its destination fiber such that it will mix with the light from at least other adjacent devices. This is called crosstalk and it degrades the data integrity coming from each of the devices or going into the fibers.

It is well known that crosstalk is undesirable. One option for eliminating crosstalk is to ensure that the fibers from a fiber cable are placed close enough to the lasers (or detectors) so that the light reaches its destination (i.e. the fiber or device) before it spreads out too much.

Some optical module companies have relied on this approach. Unfortunately, most users of components want optical components with removable cables; having to 'snap' in and out.

Unfortunately, a cable where the fibers come extremely close to the optical devices provides great potential for damage the individual devices caused by impact of an end of a fiber with a device. In addition, when a fiber cable is removed, the individual optical devices are exposed to ambient environmental conditions, including humidity, which can adversely affect the lifetime of the devices.

Optical transceiver groups have been looking at 1-D arrays of optical devices (rather than 2-D) and have typically tried to have the optical fibers themselves inserted so the attach very close to the devices. The resulting yield, reliability and failure of the devices have limited the usefulness of this technique.

Others have made 1-D devices where they use a series of independent separate fibers and attach them to a piece of silicon and then attach the silicon to piece to a module board on which the optical devices reside. Such pieces however, are not compatible with commercial connectors.

Still others have made 2-D arrays of optical devices for use in digital video cameras (CCD cameras). These products use what is called a fiberoptic faceplate which is a fused fiber bundle where the number of fibers far exceeds the number of optical devices, particularly on a use basis. These faceplates are attached to a mounting layer right on the electronic chip itself. With a faceplate, there is no alignment required between the optical devices and the faceplate itself since there are many more fibers than optical devices, the light to/from the optical devices will pass through at least several fibers regardless of alignment. One such example is shown in U.S. Pat. No. 5,074,683.

However, the approach of U.S. Pat. No. 5,074,683, where a piece is directly attached to the optical chip, forces one to construct structures on the optical chip onto which a coupler could be placed. The height of such structures would be a pre-determined height and could face tolerance errors which would limit the accuracy of height placement.

In addition, when coupling light into fiberoptic faceplates, because there are many more fibers than devices, some of the light can go into a variety of fibers and other portions of the light will miss all of the fibers and be lost. In addition, spot spreading occurs in fiberoptic faceplates which limits the efficiency of coupling.

Thus, what is needed is a way to couple light to a fiber that eliminates crosstalk.

What is also needed is a way to encapsulate optical devices to avoid exposure to ambient conditions.

What is further needed is a way to protect the surface of the devices from being impacted by fibers in a connector when it is inserted and/or removed.

SUMMARY OF THE INVENTION

In general, we have devised a way to overcome the problems noted above through the use of a fused glass fiber array integrated into an opto-electronic module.

We have also created an assembly methodology for integrating the optical coupler with optical device/electronic chip pieces. The integration methodology is broadly applicable to optical couplers made via other technologies.

One aspect of the invention involves an optical unit. The optical unit has multiple optical devices, a collimated coupler disposed relative to the multiple optical devices so that laser light can be transferred between at least two of the multiple optical devices and the collimated coupler without crosstalk, and a fused glass collimator, disposed within the collimated coupler, having multiple optical fibers arranged in a predetermined arrangement relative to the multiple optical devices so that the number of optical fibers is always equal to or greater than the number of optical devices on a use basis.

The advantages and features described herein are a few of the many advantages and features available from representative embodiments and are presented only to assist in understanding the invention. It should be understood that they are not to be considered limitations on the invention as defined by the claims, or limitations on equivalents to the claims. For instance, some of these advantages are mutually contradictory, in that they cannot be simultaneously present in a single embodiment. Similarly, some advantages are applicable to one aspect of the invention, and inapplicable to others. Thus, this summary of features and advantages should not be considered dispositive in determining equivalence. Additional features and advantages of the invention will become apparent in the following description, from the drawings, and from the claims.

DETAILED DESCRIPTION

Figure 1:
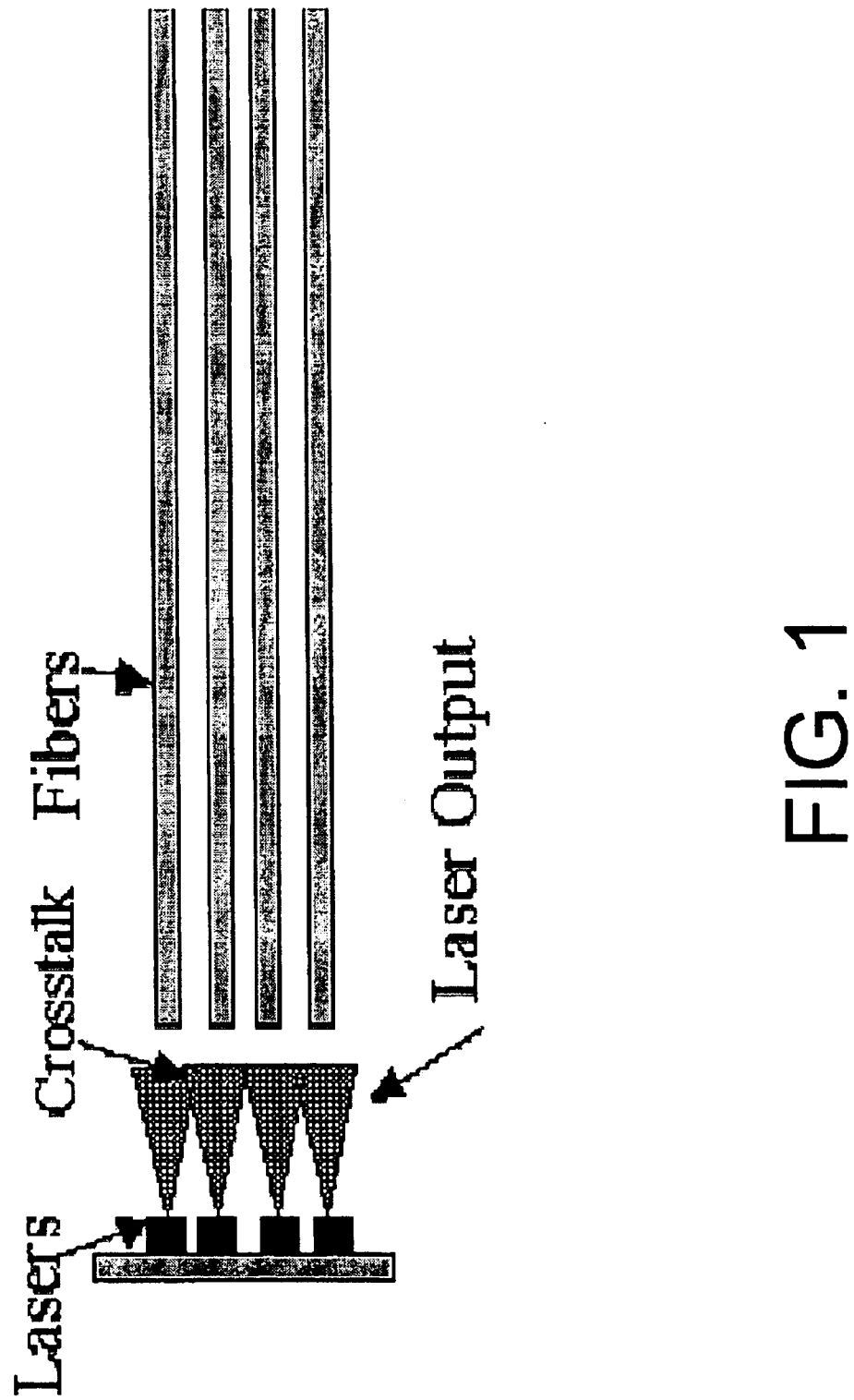
FIG. 1 shows a crosstalk condition.

The entire disclosures of U.S. patent application Ser. Nos. 09/896,664, 09/896,797 09/896,513, 09/896,196, and 09/896,192, all filed on Jun. 29, 2001, U.S. patent application Ser. No. 10/098,990, filed Mar. 14, 2002, and Provisional Patent Application Serial No. 60/302,205, filed Jun. 29, 2001 and Provisional Patent Application Serial No. 60/365,489, filed Mar. 18, 2002 are all incorporated herein by reference. Those applications describe various techniques and devices that can be combined and intermixed with the present invention to form various novel optical apparatus including connectors, optical modules having, for example, transmitters, receivers, or transceivers, and optical communications networks incorporating such optical modules.

In general, we have devised a way to overcome the problems noted above through the use of a fused glass fiber array integrated into an opto-electronic module. The fiber array acts as a collimator that captures light from individual optical devices and prevents that light from diffracting into the areas of adjacent devices. It also serves to protect the optical devices from environmental conditions.

Light coupled into the fused fiber array then can be coupled into a fiber bundle which has fibers arranged in an identical pattern and spacing as the fused fiber array.

We have further devised an optical coupler that holds the fused glass fiber array, accepts a fiber bearing connector, and is made to be permanently held near the surface of the devices. It is placed close enough to the devices to capture the light from each individual device to prevent optical crosstalk, yet is fixed permanently to the optical module so that it is never removed and hence does not leave the devices as vulnerable to ambient environmental effects.

Thus it will protect the devices from contact by any fibers and will encapsulate the optical devices from exposure to any ambient environmental conditions.

There are two separate aspects of the present invention that alone and collectively provide advantages and benefits not present in the prior art.

First, we use a fused glass collimated coupler in an optical component to direct or collect light near the optical devices and prevent diffraction of the light (and thus the resultant crosstalk between different optical devices to occur). The collimated coupler consists of a series of optical fibers which are arranged in an ordered fashion, such as a grid. The fibers are arranged such that there is always one or more devices per collimated coupler fiber on a "use basis". As used herein, a "use basis" means that the number of total fibers in the coupler and the number of total devices in the module are irrelevant, even if the two connect to each other. What matters is that if only one device is in use it will feed only one fiber. If there are two devices in use (in an array having two or more devices), they will either each have a corresponding fiber or will both have a single corresponding fiber in the collimated coupler (for example, if the two are combined by a waveguide between the devices and the collimated coupler or are redundant devices). The creation of such waveguides are described, for example, in the incorporated by reference, commonly assigned, U.S. Patent Application No. entitled "Multi-piece Fiber Optic Component and Manufacturing Technique". The creation of an array of devices with redundancy is described in the incorporated by reference, commonly assigned, U.S. Patent Application entitled "Redundant Optical Device Array".

To make insertion and placement easier the fibers are fused together into a solid block. A block of fused fibers which, when it cut to the appropriate size and has the requisite number of fibers and fiber pitch, is suitable for use as the collimated coupler and is commercially available from Collimated Holes, Inc., 460 Division Street, Campbell, Calif. 95008.

We also have separately devised a way of aligning and inserting these couplers into an optical module. In particular, we have devised a way to align this collimated coupler piece to both a fiber array and the optical devices in the module.

Figure 2B:
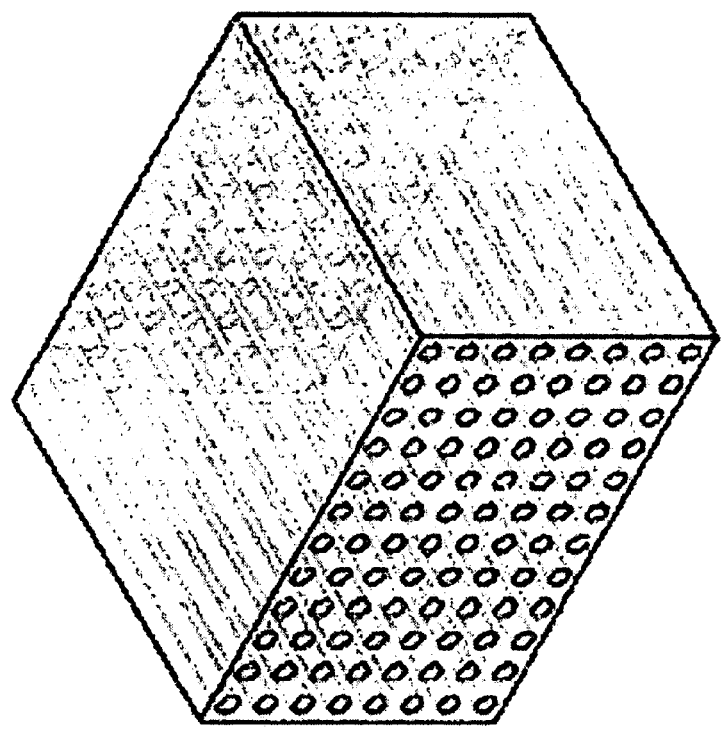
FIG. 2B shows the coupler of FIG. 2A in a "see through" form to show the internal arrangement of the fibers.
Figure 2A:
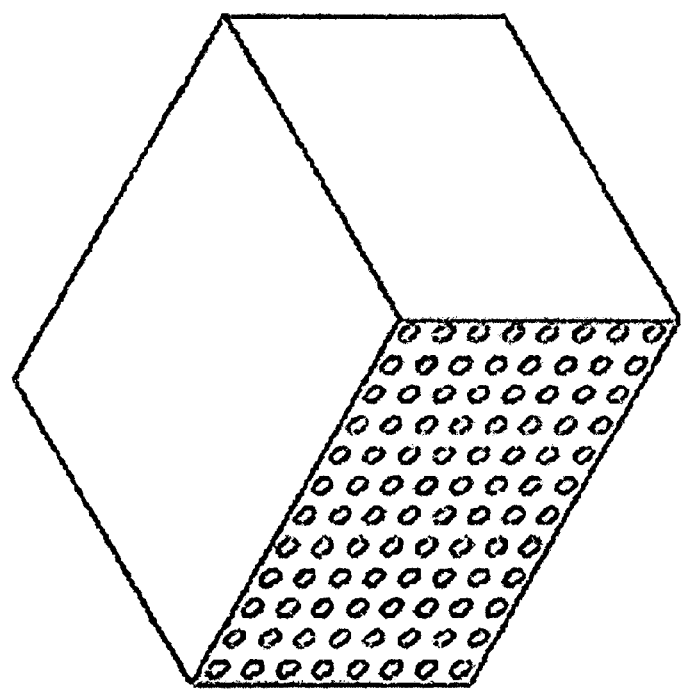
FIG. 2A shows an example illustration of a fused fiber collimated coupler.

As noted above, the collimated coupler is made up of a series of optical fibers which are fused together into a solid block. The fibers are arranged in a pattern, for example a square, hex, triangular, circular, etc., pattern which typically matches the arrangement of optical devices on an optical module chip, the exception being when there are two or more devices to a particular fiber or fibers. An example illustration of a fused fiber collimated coupler is shown in FIG. 2A. FIG. 2B shows the coupler of FIG. 2A in a "see through" form to show the internal arrangement of the fibers.

Figure 3:
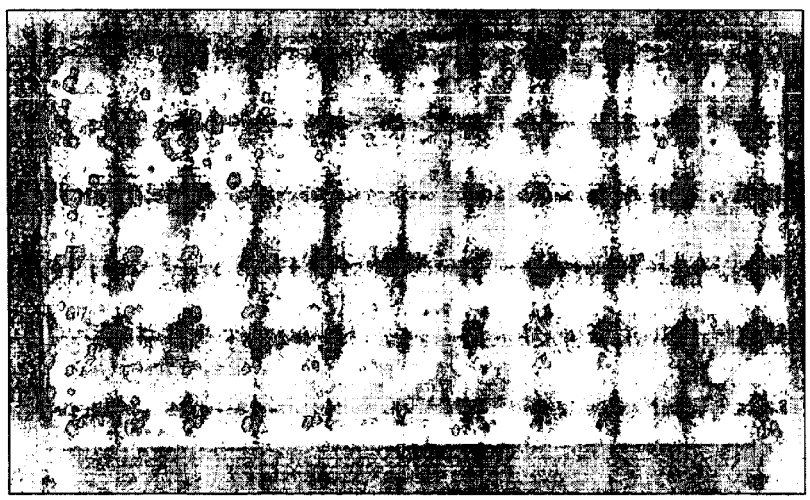
FIG. 3 is a photograph of an end view of a fused fiber collimated coupler as described herein.

The fibers are fused in a fusing process which occurs during the drawing of the fibers. Each of the fibers in a bundle is drawn down so that the group of fibers at the end of the pulling process is the correct diameter and on the correct pitch. The fibers fuse as the glass that the fibers are made from melts during the pulling process. FIG. 3 is a photograph of an end view of a fused fiber collimated coupler such as described herein. As shown, the collimated coupler is on its end so that the rows run vertical. The collimated coupler contains 7 rows of 12 fibers fused together in an arrangement where the centers of the fibers are on a 250 micron pitch between fibers in a row and from row to row.

In an alternative variant, a fused fiber collimated coupler can be replaced by a collimated coupler made of suitable size according to one of the techniques described in the incorporated by reference, commonly assigned, applications entitled "Multi-piece Fiber Optic Component and Manufacturing Technique."

Figure 4:
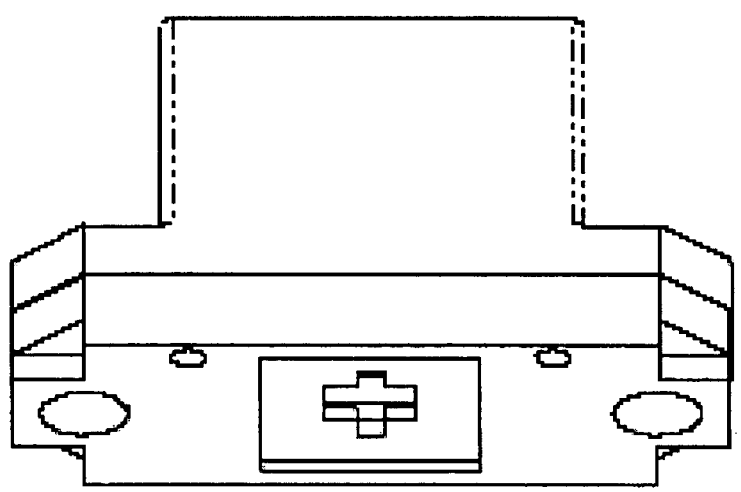
FIG. 4 shows one example coupler unit.
Figure 4:
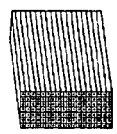

A coupler unit is created, for example by molding out of one or more pieces a suitable resin or plastic material. FIG. 4 shows one example coupler unit. As shown, the coupler unit is made up of two plastic pieces, a coupler holder piece and a module connector that have been bonded or affixed together by, for example by gluing, screwing, or ultrasonically welding them together.

The non-bonded end of the coupler holder piece is constructed with a recess of suitable dimensions to accept the collimated coupler. The coupler holder piece has a recess of a depth such that it will clear the optical chip when mounted and maintain the coupler at the distance the coupler needs to be to prevent cross talk.

The module connector, on its non-bonded side is designed to accept an mating connector piece, for example, a commercial connector of the ST, LC, MT-RJ, MTP®, MPO, MPX and SMC type (MTP being a registered trademark of US Connec Ltd.), or such other commercial or proprietary connector as desired.

Figure 5:
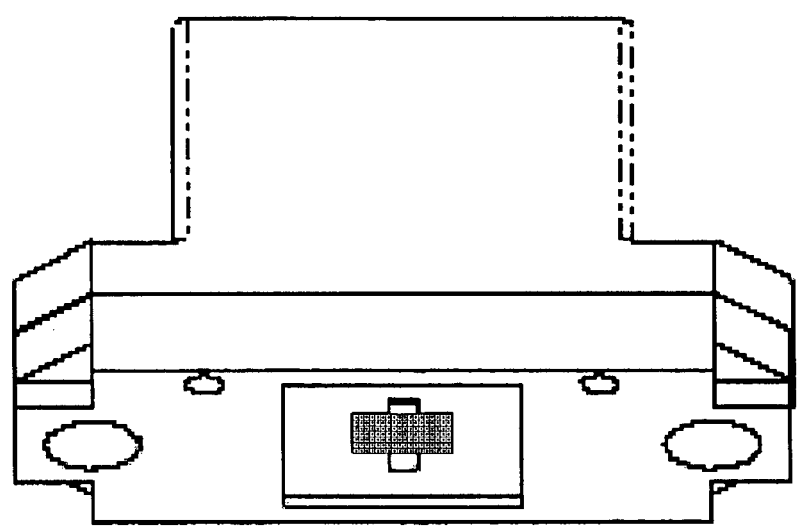
FIG. 5 shows the coupler unit of FIG. 4 after bonding and insertion of a fused fiber collimated coupler.

FIG. 5 shows the coupler unit of FIG. 4 after bonding and insertion of a fused fiber collimated coupler.

Figure 6:
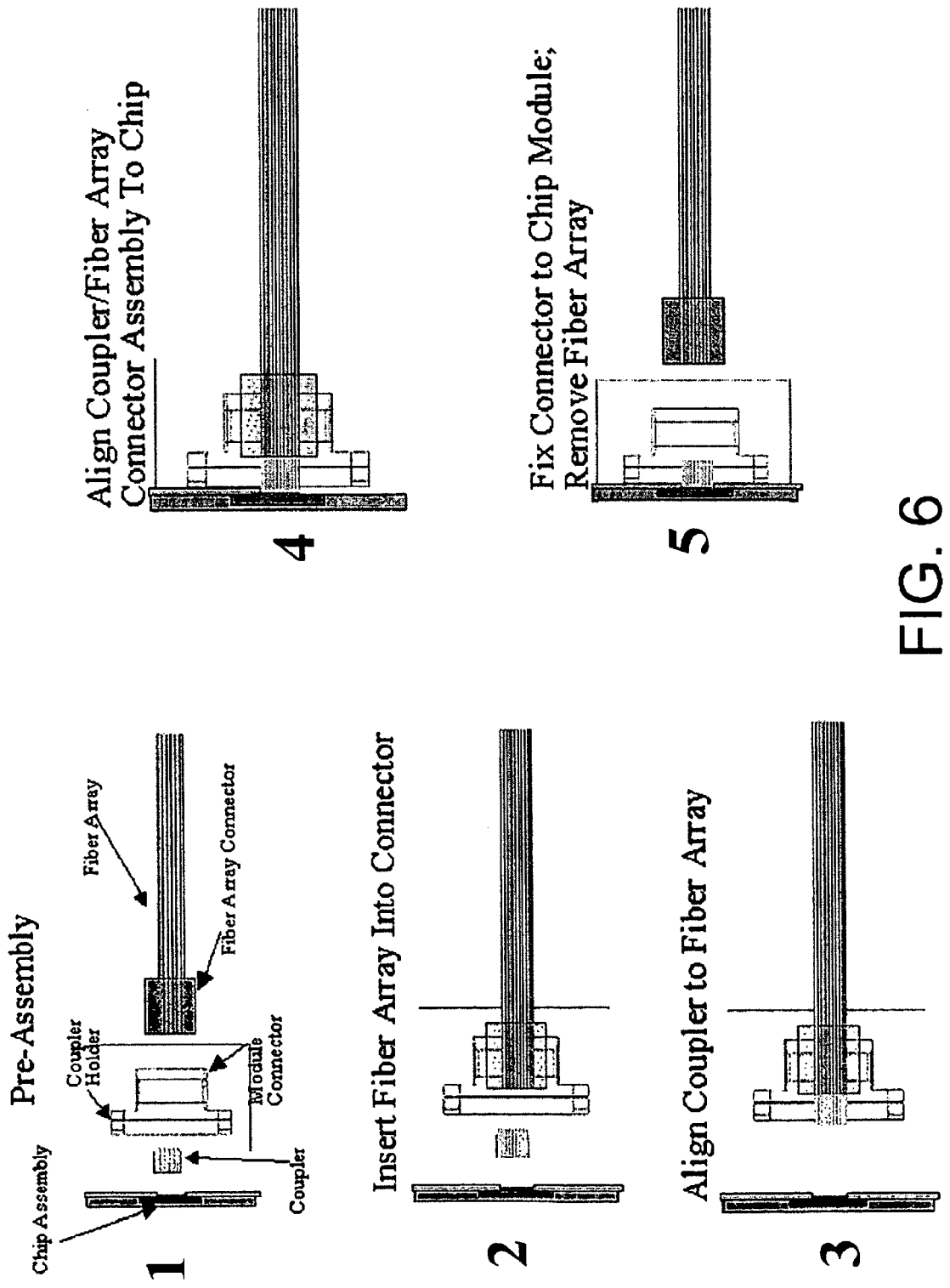
FIG. 6 shows the process of integrating the coupler holder piece with the optical modules.

The process of integrating the coupler holder piece with the optical modules is depicted in FIG. 6.

The process proceeds as follows.

1) A coupler holder piece (into which a collimated coupler can fit) is affixed (usually permanently) to a module connector (which is the latching piece that will sit on the module, and into which a complementary connector can 'snap' in order to attach a fiber or a fiber bundle to the optical device module).

2) A Fiber Bundle Array connector, having optical fibers terminated in it, is inserted into the module connector piece/Coupler holder combination(these two pieces are designed to mate with one another).

3) (an optional step) Light is shined through the fiber bundle far end so that light emits from the fiber array connector end. This light can be from a laser light source, an LED light source or any incoherent light source, for example, white light.

4) The collimated coupler is inserted into the coupler holder and aligned so that the critical optical elements of the collimated coupler are aligned to the individual fibers in the fiber bundle/bundle array connector. Once the two pieces are aligned, the collimated coupler is permanently fixed in place in the coupler holder, for example with an epoxy. This assures that any time the fiber bundle array is removed from or reconnected to the module connector that the individual fibers will still be aligned relative to the collimated coupler.

5) The assembly containing the collimated coupler, the coupler holder and the module connector is then aligned relative to the chip assembly so that all of the optical elements in the collimated coupler are aligned relative to all of the optical devices in the chip assembly. This assures that efficient transfer of light between the optical devices and the collimated coupler occurs.

6) The assembly containing the collimated coupler, the coupler holder and the module connector is then brought into close proximity to the chip assembly and permanently affixed in place. This seals the optical devices, ensures that the alignment between the optical devices and the collimated coupler is maintained and ensures that the spacing between the optical devices and the collimated coupler is small enough that crosstalk does not take place.

It should be understood that, although the above procedure was described with rreference to the fused collimated coupler, the procedure can be straightforwardly used with other types of collimated couplers, for example, microlens arrays, fiberoptic faceplates used according to the description in commonly assigned U.S. Provisional Patent Appl'n No. 60/302,205 entitled "Multi-mode Fiber Bandwidth Enhancement Using An Optical Fiber Coupler" (filed on Jun. 29, 2001 and incorporated herein by reference) or Provisional Patent Appl'n Serial No. 60/365,489 entitled "Long-Throw, Tight Focusing Optical Coupler" (filed on Mar. 18, 2002 and incorporated herein by reference), diffraction gratings, waveguide devices, etc.

In addition it should be understood that the coupler can be placed between a lens and an optical device to increase the "throw". Moreover, the approach can be used to control the efficiency of the coupling by either reducing diffraction or by deliberately causing diffraction of higher order modes.

Advantageously, the insertion into the coupler holder first, followed by attachment onto the electronic chip assembly not only allows aligning of the collimated coupler relative to the optical devices but also allows for the accurate control the distance between the optical devices and the collimated coupler.

A further advantage to using the technique described herein is it allows exact placement of the coupler as close or as far as is needed on a module-by-module basis. The approach also ensures that the collimated coupler is aligned precisely with respect to any fiber bundle which is inserted.

Finally, it should be noted that the approach has applicability, not only to active optical devices, but also to passive devices such as coupling light to MEMS structures for all-optical networks and the like or of coupling of elements to elements where there is a 1—1 relationship between the two elements being coupled.

It should be understood that the above description is only representative of illustrative embodiments. For the convenience of the reader, the above description has focused on a representative sample of all possible embodiments, a sample that teaches the principles of the invention. The description has not attempted to exhaustively enumerate all possible variations. That alternate embodiments may not have been presented for a specific portion of the invention, or that further undescribed alternate embodiments may be available for a portion, is not to be considered a disclaimer of those alternate embodiments. One of ordinary skill will appreciate that many of those undescribed embodiments incorporate the same principles of the invention and others are equivalent.

What is claimed is:

1. A method of integrating a fused fiber collimated coupler into an optical unit comprising:

a) inserting the fused fiber collimated coupler into a coupler holder, b) aligning the fused fiber collimated coupler with a fiber bundle array so that the individual fibers of the fiber bundle array are aligned with individual fused fiber optical elements of the fused fiber collimated coupler, and c) permanently affixing the fused fiber collimated coupler to the coupler holder.

2. The method of claim 1 further comprising:

affixing the fused fiber collimated coupler to the coupler holder by means of an epoxy.

3. The method of claim 1 wherein the aligning the fused fiber collimated coupler with the fiber bundle array comprises:

shining light through a far end of the fiber bundle array so that light emits from a connector end of the fiber bundle array.

4. The process of claim 3 wherein the shining comprises applying one of: laser emitted light, LED generated light, or white light.

5. The process of claim 1 further comprising:

aligning the optical unit so that the individual fused fiber optical elements of the collimated coupler are aligned with one or more optical devices of a chip assembly.

6. The process of claim 5 further comprising:

placing the optical unit in close proximity to the chip assembly.

7. The process of claim 6 further comprising:

affixing the optical unit to the chip assembly.

8. The process of claim 7 further comprising:

affixing the optical unit to the chip assembly by at least one of gluing, screwing or ultrasonic welding.

* * * * *